United States Patent
Hamazaki

(10) Patent No.: US 7,665,911 B2
(45) Date of Patent: Feb. 23, 2010

(54) OPTICAL WAVEGUIDE HOLDING DEVICE AND OPTICAL TRANSCEIVER

(75) Inventor: Masahiro Hamazaki, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 12/071,406

(22) Filed: Feb. 20, 2008

(65) Prior Publication Data
US 2009/0016734 A1    Jan. 15, 2009

(30) Foreign Application Priority Data
Jul. 13, 2007   (JP)   ............... 2007-184448

(51) Int. Cl.
G02B 6/36 (2006.01)
G02B 6/26 (2006.01)
G02B 6/42 (2006.01)

(52) U.S. Cl. ............... 385/93; 385/14; 385/15; 385/31; 385/32; 385/33; 385/39; 385/49; 385/89; 385/92

(58) Field of Classification Search ........... 385/93, 385/14, 33, 49, 89, 92
See application file for complete search history.

(56) References Cited

U.S. PATENT DOCUMENTS

| | | | | |
|---|---|---|---|---|
| 6,056,448 | A * | 5/2000 | Sauter et al. ............... | 385/92 |
| 6,356,686 | B1 * | 3/2002 | Kuczynski ............... | 385/39 |
| 6,404,960 | B1 * | 6/2002 | Hibbs-Brenner et al. ...... | 385/52 |
| 6,450,701 | B1 * | 9/2002 | Cryan et al. ............... | 385/89 |
| 6,741,778 | B1 * | 5/2004 | Chan et al. ............... | 385/52 |
| 6,874,952 | B2 * | 4/2005 | Nishimura ............... | 385/89 |
| 6,905,256 | B2 * | 6/2005 | Morse et al. ............... | 385/89 |
| 6,905,257 | B2 * | 6/2005 | Eichenberger et al. ........ | 385/89 |
| 6,934,450 | B2 * | 8/2005 | Hiramatsu ............... | 385/52 |
| 7,137,746 | B2 * | 11/2006 | Kato ............... | 385/94 |
| 7,234,874 | B2 * | 6/2007 | Morse et al. ............... | 385/53 |
| 7,300,216 | B2 * | 11/2007 | Morse et al. ............... | 385/92 |
| 7,359,594 | B2 * | 4/2008 | Nishizawa et al. ............ | 385/32 |
| 7,441,965 | B2 * | 10/2008 | Furuno et al. ............... | 385/93 |

FOREIGN PATENT DOCUMENTS

| | | |
|---|---|---|
| JP | 2001-51271 | 2/2001 |
| JP | 2002-164614 | 6/2002 |
| JP | 2003-255416 | 9/2003 |

* cited by examiner

Primary Examiner—Ryan Lepisto

(57) ABSTRACT

A disclosed optical waveguide holding device is attached onto a printed circuit board of an optical transceiver that performs conversion between an electric signal and an optical signal. The optical waveguide holding device holds an optical waveguide between an external optical fiber and a photoelectric conversion unit attached onto or formed on the printed circuit board. The optical waveguide holding device includes a first connection part configured to optically connect a first end of the optical waveguide to a light receiving/emitting part of the photoelectric conversion unit; a second connection part configured to optically connect a second end of the optical waveguide to the external optical fiber; an optical fiber forming the optical waveguide, disposed between the first end and the second end of the optical waveguide; a first holder configured to hold the optical fiber on a side of the first end; and a second holder configured to hold the optical fiber on a side of the second end.

5 Claims, 6 Drawing Sheets

OPTICAL WAVEGUIDE HOLDING DEVICE AND OPTICAL TRANSCEIVER

BACKGROUND OF THE INVENTION

1. Field of the Invention

The present invention relates to an optical waveguide holding device attached onto a printed circuit board of an optical transceiver for performing conversion between electric signals and optical signals.

2. Description of the Related Art

Conventionally, communications performed with optical fibers have become prevalent due to the development of high-speed, large-capacity communication networks and communication control devices. For example, information terminals installed in offices and households are connected, by optical fibers, to a communication network such as the Internet to transmit/receive signals. Optical transceivers, which are capable of performing bi-directional conversion between electric signals and optical signals, are provided where personal computers and peripheral equipment are connected to an optical fiber (external optical fiber). Such an optical transceiver includes an optical waveguide provided between the external optical fiber and a photoelectric conversion unit (see, for example, Patent Document 1).

Patent Document 1: Japanese Laid-Open Patent Application No. 2001-051271

The above-described optical transceiver includes an optical waveguide holding device for holding the optical waveguide. The optical waveguide holding device is provided on a printed circuit board on which the photoelectric conversion unit is disposed. If the optical waveguide holding device is a molded product made of the same material as that of the cladding layer of optical fiber, a gap for providing the optical waveguide and a part to be connected to the external optical fiber is integrally formed in the optical waveguide holding device. A core member is injected into the integrally formed gap to form an optical fiber, and this optical fiber is used as the optical waveguide.

As described above, the core member is provided in the gap that has been formed by a molding process. For this reason, there have been limitations as to the freedom in the direction of connecting to the external optical fiber (connection direction) or the freedom in the position for connecting the external optical fiber (connection position).

Moreover, with the molding process, there are limitations in the molding thickness. Therefore, there may be cases where the densification of the optical waveguide is limited.

SUMMARY OF THE INVENTION

The present invention provides an optical waveguide holding device and an optical transceiver in which one or more of the above-described disadvantages are eliminated.

An embodiment of the present invention provides an optical waveguide holding device and an optical transceiver in which the optical fiber is disposed in the optical waveguide in such a manner that the freedom in the connection with the external optical fiber can be increased and densification can be further enhanced.

An embodiment of the present invention provides an optical waveguide holding device attached onto a printed circuit board of an optical transceiver that performs conversion between an electric signal and an optical signal, wherein the optical waveguide holding device holds an optical waveguide between an external optical fiber and a photoelectric conversion unit attached onto or formed on the printed circuit board, the optical waveguide holding device including a first connection part configured to optically connect a first end of the optical waveguide to a light receiving/emitting part of the photoelectric conversion unit; a second connection part configured to optically connect a second end of the optical waveguide to the external optical fiber; an optical fiber forming the optical waveguide, disposed between the first end and the second end of the optical waveguide; a first holder configured to hold the optical fiber on a side of the first end; and a second holder configured to hold the optical fiber on a side of the second end.

According to one embodiment of the present invention, an optical waveguide holding device and an optical transceiver are provided, in which the optical fiber is disposed in the optical waveguide in such a manner that the freedom in the connection with the external optical fiber can be increased and densification can be further enhanced.

BRIEF DESCRIPTION OF THE DRAWINGS

Other objects, features and advantages of the present invention will become more apparent from the following detailed description when read in conjunction with the accompanying drawings, in which:

FIG. 1A is an overall perspective view and FIG. 1B is a perspective view of only a printed circuit board;

FIG. 2A illustrates the connection of a unit-side (photoelectric conversion unit-side) holder, a fiber-side holder, and an optical fiber, FIG. 2B illustrates the casing of the optical waveguide holding device, FIG. 2C illustrates the casing of the optical waveguide holding device as viewed from the bottom and the backside, and FIG. 2D illustrates the unit-side holder and the fiber-side holder;

DETAILED DESCRIPTION OF THE PREFERRED EMBODIMENTS

A description is given, with reference to the accompanying drawings, of an optical waveguide holding device and an optical transceiver according to an embodiment of the present invention.

Figure 1A:
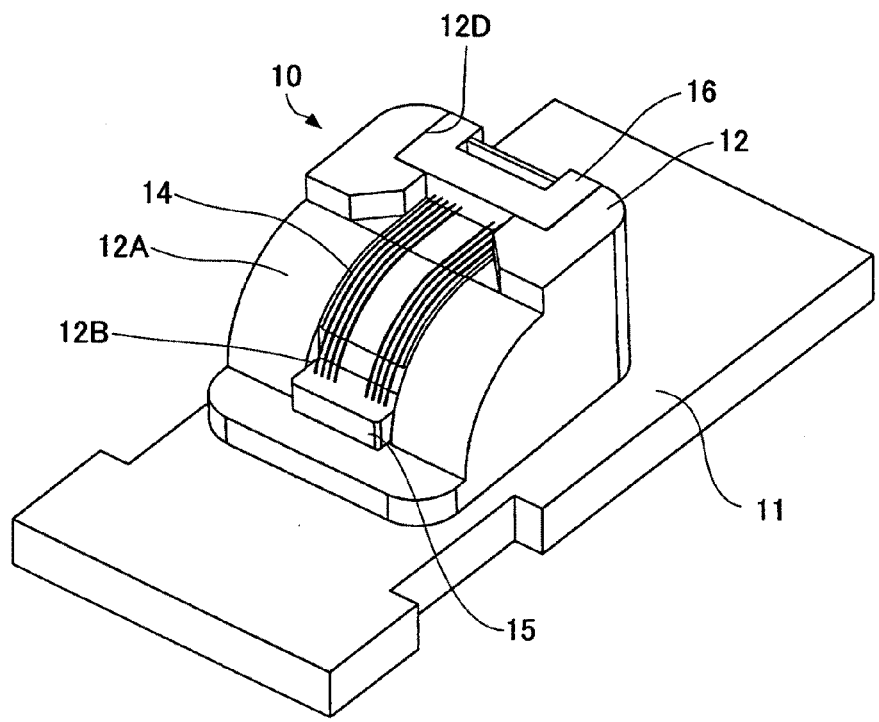
FIGS. 1A and 1B illustrate an optical waveguide holding device and an optical transceiver according to an embodiment of the present invention, where
Figure 1B:
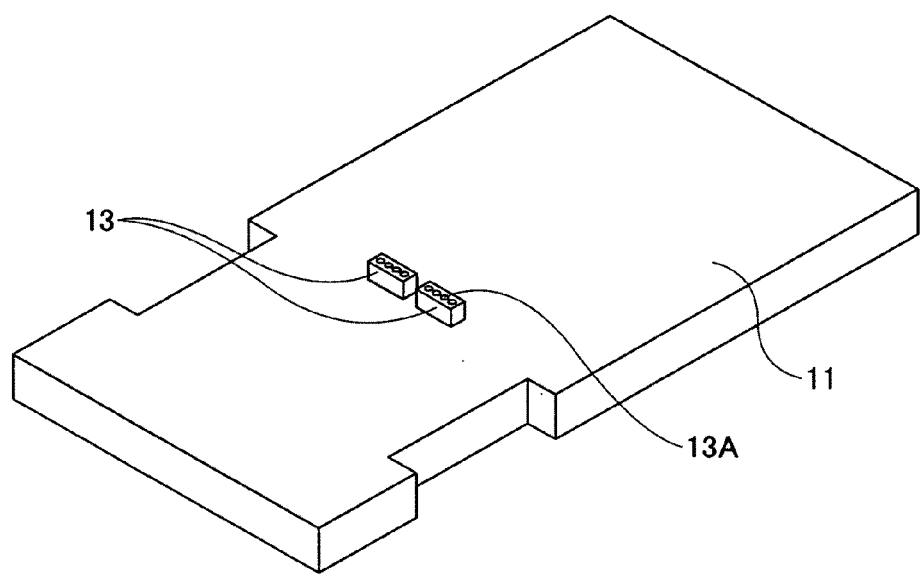

FIGS. 1A and 1B illustrate an optical waveguide holding device and an optical transceiver according to an embodiment of the present invention. FIG. 1A is an overall perspective view and FIG. 1B is a perspective view of only a printed circuit board. An optical transceiver 10 according to an embodiment the present invention includes an optical waveguide holding device 12 attached onto a printed circuit board 11.

The printed circuit board 11 has not-shown copper wirings formed on a board made of glass epoxy resin. As shown in FIG. 1B, photoelectric conversion units 13 are formed on the printed circuit board 11. The photoelectric conversion units 13 are connected to an external circuit via the not-shown copper wirings and a connector. The photoelectric conversion units 13 are formed in such a manner that light emitting/receiving parts 13A are positioned on the substantially same plane as the top surface of the printed circuit board 11. However, as a matter of convenience in the description, the outlines of the light emitting/receiving parts 13A are indicated with solid lines in FIG. 1B.

The optical waveguide holding device 12 is made of an olefin resin functioning as a cladding material. A photoelectric conversion unit-side holder 15 (hereinafter, "unit-side holder 15") and a fiber-side holder 16 for holding optical fibers 14 are attached onto a top surface 12A that is curved by substantially 90 degrees.

Figure 2A:
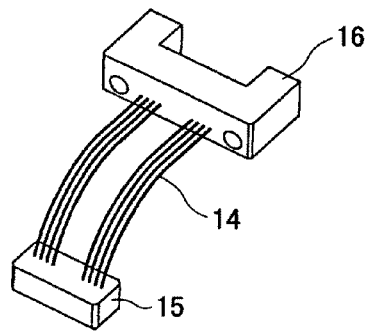
FIGS. 2A through 2D illustrate the structure of the optical waveguide holding device according to the embodiment of the present invention, where
Figure 2B:
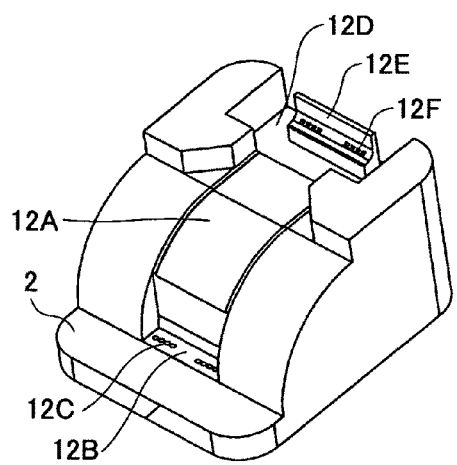
Figure 2C:
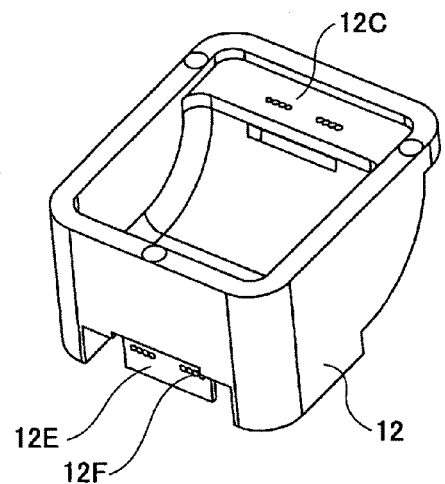
Figure 2D:

FIGS. 2A through 2D illustrate the structure of the optical waveguide holding device 12 according to the embodiment of the present invention. FIG. 2A illustrates the connection of the unit-side holder 15, fiber-side holder 16, and the optical fibers 14. FIG. 2B illustrates the casing of the optical waveguide holding device 12. FIG. 2C illustrates the casing of the optical waveguide holding device 12 as viewed from the bottom and the backside. FIG. 2D illustrates the unit-side holder 15 and the fiber-side holder 16.

As shown in FIG. 2A, both ends of the optical fibers 14 are respectively held by the unit-side holder 15 and the fiber-side holder 16.

As shown in FIG. 2B, the casing of the optical waveguide holding device 12 has an engagement part 12B integrally formed therein, which engages with the unit-side holder 15. Unit-side lenses 12C are integrally formed in the engagement part 12B (see FIG. 2C for this structure as viewed from the bottom and from the backside).

Furthermore, an engagement part 12D, which engages with the fiber-side holder 16, is integrally formed in the casing of the optical waveguide holding device 12. A lens holding part 12E and fiber-side lenses 12F are integrally formed in the engagement part 12D (see FIG. 2C for this structure as viewed from the bottom and from the backside). External optical fibers are connected to the optical waveguide holding device 12 in such a manner as to face the lens holding part 12E from the backside. Accordingly, the external optical fibers are optically connected to the lens holding part 12E.

The optical waveguide holding device 12 holds the external optical fibers, which are connected to its backside, and the optical waveguide, so that optical signals can be transmitted/received between the photoelectric conversion units 13 disposed on its bottom. Specifically, in the optical waveguide holding device 12, the optical fibers 14 acting as the optical waveguide are curved by substantially 90 degrees. For this purpose, the top surface 12A is curved by substantially 90 degrees.

The optical fibers 14, each of which has both of its ends respectively held by the unit-side holder 15 and the fiber-side holder 16, are attached to the casing of the optical waveguide holding device 12 as the unit-side holder 15 and the fiber-side holder 16 engage with the engagement part 12B and the engagement part 12D, respectively.

The unit-side lenses 12C have diameters of, for example, around 0.2 mm. The unit-side lenses 12C function as members for optically connecting the light emitting/receiving parts 13A of the photoelectric conversion units 13 to the optical fibers 14, when the optical waveguide holding device 12 is adhered to the printed circuit board 11.

Between the optical fibers 14 and the light emitting/receiving parts 13A of the photoelectric conversion units 13, there is a gap of, for example, around 500 μm. Optical signals emitted from the optical fibers 14 focus at the unit-side lenses 12C, and then enter the light emitting/receiving parts 13A of the photoelectric conversion units 13. The same applies to the reverse direction.

This description refers to the light emitting/receiving parts 13A. However, in a practical situation, one of the two photoelectric conversion units 13 shown in FIG. 1B is a photoelectric conversion unit for receiving optical signals and converting them into electric signals, and light receiving parts are formed in this photoelectric conversion unit. The other one of the two photoelectric conversion units 13 shown in FIG. 1B is a photoelectric conversion unit for converting the electric signals into optical signals and transmitting the optical signals, and light emitting parts are formed in this photoelectric conversion unit. Nevertheless, this description refers to the photoelectric conversion units 13 and the light emitting/receiving parts 13A without making any particular distinctions.

The fiber-side lenses 12F have diameters of, for example, around 0.2 mm. The fiber-side lenses 12F function as members for optically connecting the not-shown external optical fibers to the optical fibers 14, when the optical waveguide holding device 12 is adhering to the printed circuit board 11.

The fiber-side lenses 12F are held by the lens holding part 12E. There is a gap of, for example, around 500 μm between the optical fibers 14 and the fiber-side lenses 12F and between the fiber-side lenses 12F and the external optical fibers. Optical signals emitted from the optical fibers 14 focus at the fiber-side lenses 12F, and then enter the external optical fibers. The same applies to the reverse direction.

As shown in FIG. 2D, there are holes 15a and 16a provided in the unit-side holder 15 and the fiber-side holder 16, respectively. The optical fibers 14 are inserted into these holes 15a, 16a. The ends of the optical fibers 14 having been inserted through the holes 15a and 16a are held by the unit-side holder 15 and the fiber-side holder 16 in such a manner as to face the unit-side lenses 12C and the fiber-side lenses 12F, respectively.

The unit-side holder 15 and the fiber-side holder 16 respectively engage with the engagement part 12B and the engagement part 12D of the optical waveguide holding device 12, when the optical fibers 14 are held.

As described above, in the optical waveguide holding device 12 according to an embodiment of the present invention, regular optical fibers 14 that are cut to a predetermined length are attached to the optical waveguide holding device 12 in a case where the ends of the optical fibers 14 are held by the unit-side holder 15 and the fiber-side holder 16. Therefore, the optical waveguide holding device 12 is easy to manufacture, and the positioning accuracy of the optical fibers 14 with respect to the optical waveguide holding device 12 can be controlled more easily compared to the conventional technology. Furthermore, by improving the positioning accuracy of the above members, the positioning accuracy of the optical fibers 14 can be improved more easily compared to the case of injecting a core member into a gap that is integrally formed by a molding process as in the conventional technology.

Figure 3:
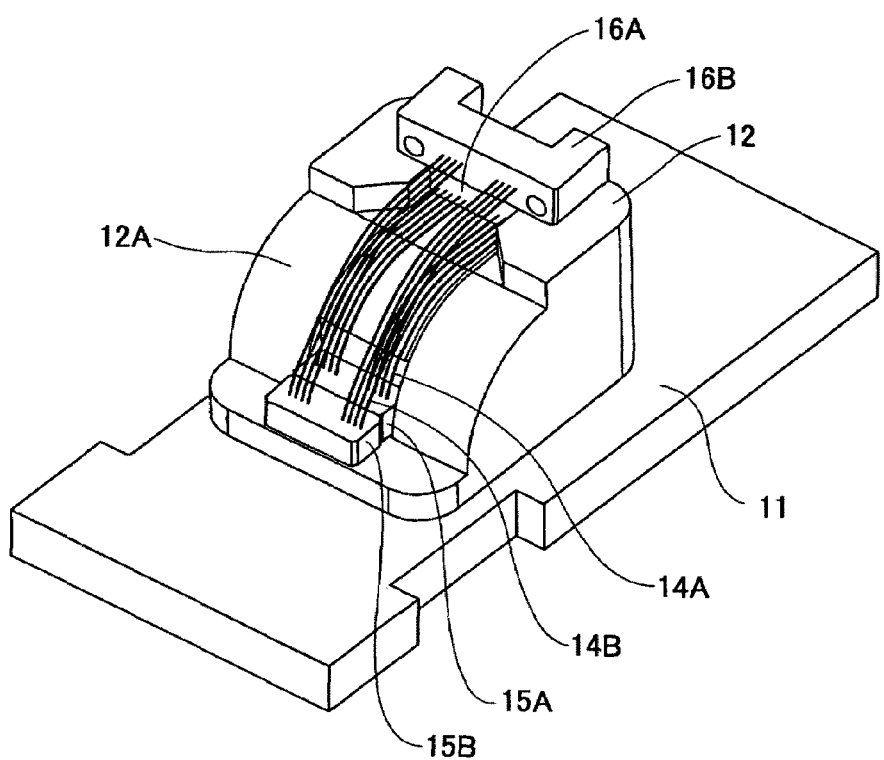
FIG. 3 illustrates an optical waveguide holding device and an optical transceiver according to a modification of the embodiment of the present invention.

FIG. 3 illustrates an optical waveguide holding device and an optical transceiver according to a modification of the embodiment of the present invention. In the optical transceiver 10 according to the modification, there are two tiers of unit-side holders and fiber-side holders stacked on each other. Specifically, optical fibers 14A are held by a unit-side holder 15A and a fiber-side holder 16A, and optical fibers 14B are held by a unit-side holder 15B and a fiber-side holder 16B. In this manner, the optical fibers 14A and the optical fibers 14B are provided in two tiers.

The optical waveguide holding device 12 uses regular optical fibers 14A and regular optical fibers 14B as the optical waveguide, which are attached to the casing of the optical waveguide holding device 12 in a case where the ends of the optical fibers 14A, 14B are held by the unit-side holders 15A, 15B and the fiber-side holders 16A, 16B, respectively. Therefore, the optical waveguide holding device 12 shown in FIG. 3 can be easily realized with high precision, in which the optical fibers 14A and the optical fibers 14B are stacked in two tiers with the use of the two-tiered unit-side holders 15A, 15B and the two-tiered fiber-side holders 16A, 16B. The number of tiers to be stacked can be three or more.

Figure 4:
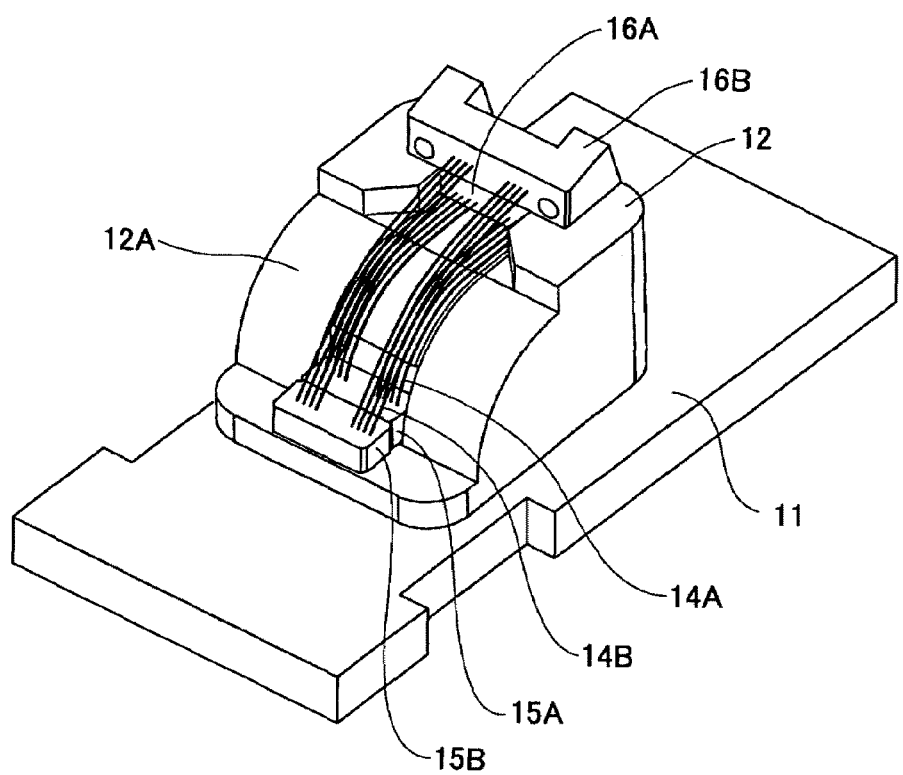
FIG. 4 illustrates an optical waveguide holding device and an optical transceiver according to another modification of the embodiment of the present invention.

FIG. 4 illustrates an optical waveguide holding device and an optical transceiver according to another modification of the embodiment of the present invention. In the optical transceiver 10 according to the modification, the method of attaching the fiber-side holder 16B is modified. The fiber-side holder 16A and the fiber-side holder 16B are not parallel to each other as shown in FIG. 3; in FIG. 4, they are attached in such a manner as to be tilted by a certain angle with respect to each other. Although not shown in FIG. 4, the lens holding part 12E is shaped such that the optical fibers 14A and the optical fibers 14B, which are respectively held by the fiber-side holders 16A and 16B on the top tier and the bottom tier that are tilted by a certain angle with respect to each other, are optically connected to the fiber-side lenses 12F that are integrally formed in the lens holding part 12E.

In such a structure having the optical fibers 14 stacked in plural tiers, the direction of connecting the external optical fibers (connection direction) and the position for connecting the external optical fibers (connection position) can be easily set at an arbitrary angle and an arbitrary position. Accordingly, the external optical fibers can be easily connected to the top tier and the bottom tier.

Figure 5A:
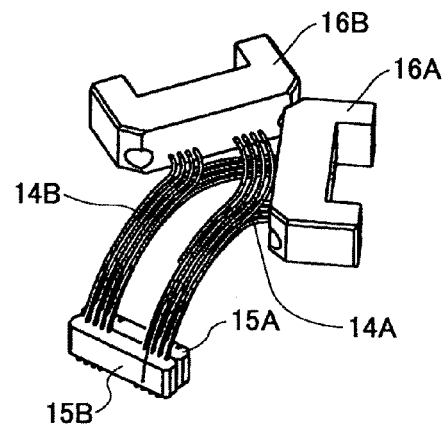
FIGS. 5A and 5B illustrate an optical waveguide holding device and an optical transceiver according to yet another modification of the embodiment of the present invention.
Figure 5B:
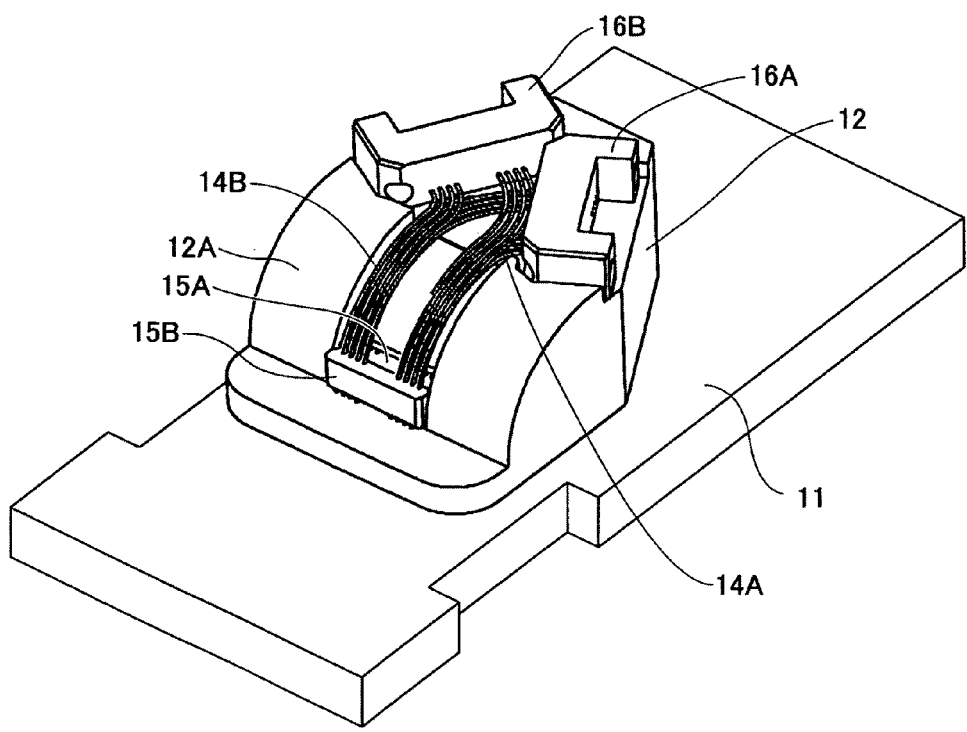
Figure 6A:
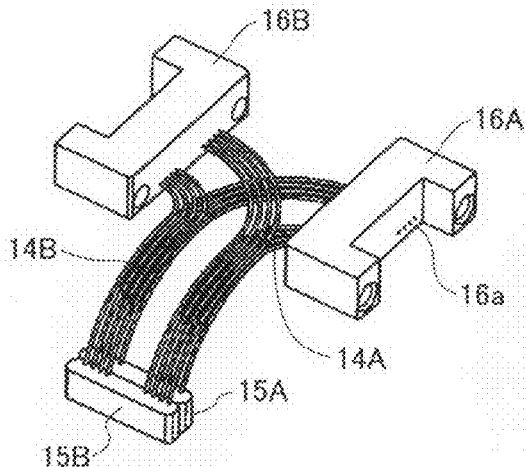
FIGS. 6A and 6B illustrate an optical waveguide holding device and an optical transceiver according to yet another modification of the embodiment of the present invention.
Figure 6B:
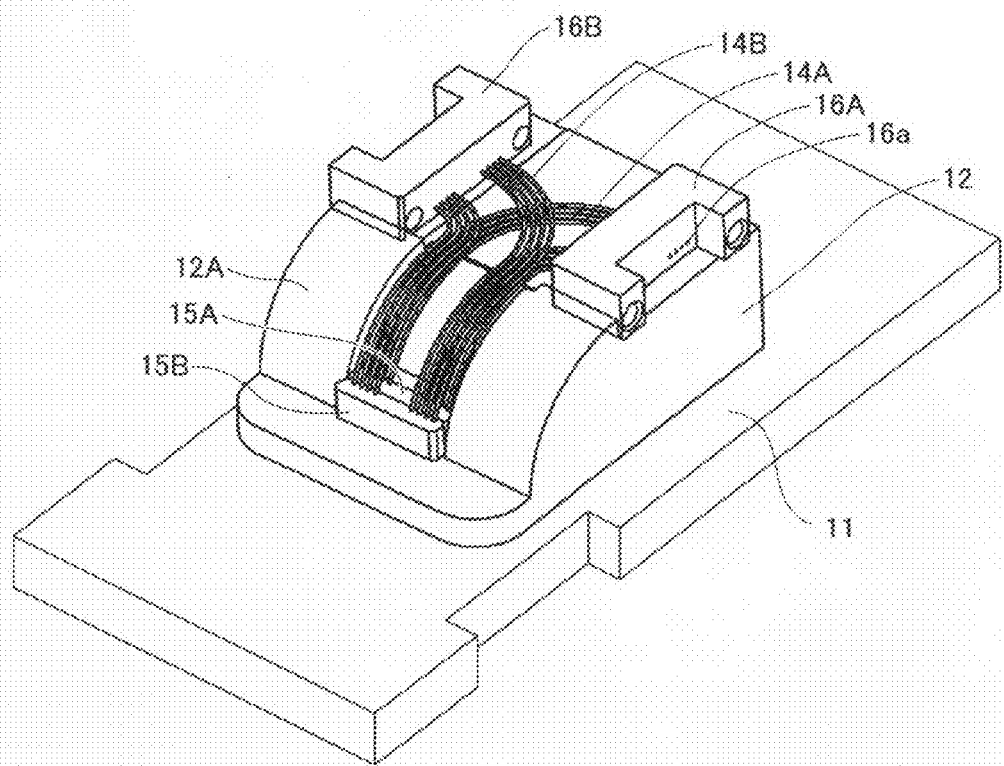

FIGS. 5A, 5B, and 6 illustrate optical waveguide holding devices and optical transceivers according to other modifications of the embodiment of the present invention. In each of the optical transceivers 10 according to these modifications, the fiber-side holders 16A, 16B shown in FIG. 3 are attached in a different manner. The fiber-side holders 16A, 16B are not attached in such a manner that the top tier (16A) and the bottom tier (16B) are in the same direction as shown in FIG. 3 (the direction along the backside of the optical waveguide holding device 12); instead, the fiber-side holders 16A, 16B are attached in such a manner that the top tier (16A) and the bottom tier (16B) are tilted by a certain angle with respect to each other and facing the sides of the optical waveguide holding device 12.

In such a structure having the optical fibers 14 stacked in plural tiers, the direction of connecting the external optical fibers and the position for connecting the external optical fibers can be easily set at an arbitrary angle and an arbitrary position. Accordingly, the external optical fibers can be easily connected to the top tier and the bottom tier.

In the above embodiment, the optical waveguide holding device 12 includes the top surface 12A that is curved by substantially 90 degrees, and the direction of the waveguide configured with the optical fibers 14 is changed by 90 degrees. Furthermore, the external optical fibers can be attached at an arbitrary angle by arbitrarily adjusting the angle of the backside of the optical waveguide holding device 12 (i.e., by fabricating the optical waveguide holding device 12 in such a manner as to arbitrarily change the angles at which the engagement part 12D and the lens holding part 12E are set).

In the above embodiment, the photoelectric conversion units 13 are formed on the printed circuit board 11; however, the photoelectric conversion units 13 can be fabricated separately from the printed circuit board 11 and can then be attached onto the printed circuit board 11.

According to one embodiment of the present invention, an optical waveguide holding device is attached onto a printed circuit board of an optical transceiver that performs conversion between an electric signal and an optical signal, wherein the optical waveguide holding device holds an optical waveguide between an external optical fiber and a photoelectric conversion unit attached onto or formed on the printed circuit board, the optical waveguide holding device including a first connection part configured to optically connect a first end of the optical waveguide to a light receiving/emitting part of the photoelectric conversion unit; a second connection part configured to optically connect a second end of the optical waveguide to the external optical fiber; an optical fiber forming the optical waveguide, disposed between the first end and the second end of the optical waveguide; a first holder configured to hold the optical fiber on a side of the first end; and a second holder configured to hold the optical fiber on a side of the second end.

The optical waveguide holding device can be configured such that said optical fiber includes plural of the optical fibers, wherein a first optical fiber for transmitting the optical signal and a second optical fiber for receiving the optical signal are disposed in parallel with respect to each other; and each of the first holder and the second holder is divided in such a manner as to separately hold the first optical fiber for transmitting the optical signal and the second optical fiber for receiving the optical signal.

The optical waveguide holding device can be configured such that plural of the first holders are provided in plural tiers stacked on each other and plural of the second holders are provided in plural tiers stacked on each other; plural of the optical fibers are provided in the plural tiers; and the first holder and the second holder in each tier hold the optical fibers of one of the plural tiers.

The optical waveguide holding device can be configured such that among the second holders provided in the plural tiers stacked on each other, in the second holder in at least one of the plural tiers, a connection direction or a connection position of the external optical fibers is different from that of the second holder in the other tier.

The optical waveguide holding device can be configured such that each of the first connection part and the second connection part includes a lens that is integrally molded thereto.

According to one embodiment of the present invention, an optical transceiver includes the printed circuit board on which the photoelectric conversion unit is attached or formed; and any of the above optical waveguide holding devices.

The present invention is not limited to the specifically disclosed embodiment, and variations and modifications may be made without departing from the scope of the present invention.

The present application is based on Japanese Priority Patent Application No. 2007-184448, filed on Jul. 13, 2007, the entire contents of which are hereby incorporated by reference.

What is claimed is:
1. An optical waveguide holding device attached onto a printed circuit board of an optical transceiver that performs conversion between an electric signal and an optical signal, wherein the optical waveguide holding device holds an optical waveguide between an external optical fiber and a photoelectric conversion unit attached onto or formed on the printed circuit board, the optical waveguide holding device comprising:

- a first connection part configured to optically connect a first end of the optical waveguide to a light receiving/emitting part of the photoelectric conversion unit;
- a second connection part configured to optically connect a second end of the optical waveguide to the external optical fiber;
- an optical fiber forming the optical waveguide, disposed between the first end and the second end of the optical waveguide;
- a first holder configured to hold the optical fiber on a side of the first end; and
- a second holder configured to hold the optical fiber on a side of the second end,
- wherein each of the first connection part and the second connection part comprises a lens that is integrally molded thereto.

2. The optical waveguide holding device according to claim 1, wherein:

- said optical fiber comprises plural of the optical fibers, wherein a first optical fiber for transmitting the optical signal and a second optical fiber for receiving the optical signal are disposed in parallel with respect to each other; and
- each of the first holder and the second holder is divided in such a manner as to separately hold the first optical fiber for transmitting the optical signal and the second optical fiber for receiving the optical signal.

3. The optical waveguide holding device according to claim 1, wherein:

- plural of the first holders are provided in plural tiers stacked on each other and plural of the second holders are provided in plural tiers stacked on each other;
- plural of the optical fibers are provided in the plural tiers; and
- the first holder and the second holder in each tier hold the optical fiber of one of the plural tiers.

4. The optical waveguide holding device according to claim 3, wherein:

- among the second holders provided in the plural tiers stacked on each other, in the second holder in at least one of the plural tiers, a connection direction or a connection position of the external optical fiber is different from that of the second holder in the other tier.

5. An optical transceiver comprising:

a printed circuit board; and an optical waveguide holding device attached or formed onto the printed circuit board that performs conversion between an electric signal and an optical signal, wherein the optical waveguide holding device holds an optical waveguide between an external optical fiber and a photoelectric conversion unit attached onto or formed on the printed circuit board, the optical waveguide holding device comprising:

- a first connection part configured to optically connect a first end of the optical waveguide to a light receiving/emitting part of the photoelectric conversion unit,
- a second connection part configured to optically connect a second end of the optical waveguide to the external optical fiber,
- an optical fiber forming the optical waveguide, disposed between the first end and the second end of the optical waveguide,
- a first holder configured to hold the optical fiber on a side of the first end, and
- a second holder configured to hold the optical fiber on a side of the second end, wherein each of the first connection part and the second connection part comprises a lens that is integrally molded thereto.

* * * * *